Patented Dec. 26, 1950

2,535,117

UNITED STATES PATENT OFFICE 2,535,117

PROCESS FOR RECOVERY OF GLUTAMIC ACID AND OTHER VALUES FROM STEFFEN WASTE WATER

Arthur N. Bennett, Denver, Colo., assignor to The Great Western Sugar Company, Denver, Colo., a corporation of New Jersey No Drawing. Application June 15, 1948, Serial No. 33,228

5 Claims. (Cl. 260—527)

The present invention relates to a process for the recovery of glutamic acid from Steffen waste water and more particularly to a process for the recovery of glutamic acid from Steffen waste water which possesses a natural alkalinity so that the raw waste water has a pH of between about 12.7 and 13 at 25.0° C. Steffen waste water produced in the Rocky Mountain area possesses a high natural alkalinity of this character.

It is an object of this invention to provide a novel process for the economical recovery of glutamic acid from Steffen waste water possessing a high natural alkalinity.

It is a further object to provide a novel process for the economical recovery of glutamic acid of high purity from Steffen waste water having a relatively low content of glutamic acid, that is, for example, less than 8.5% of the dry solids contained in such waste water.

It is still another object of this invention to provide a process for the recovery of glutamic acid from Steffen waste water in which the production of humic substances is kept at a minimum.

Another object of the invention is to provide a process for the recovery of glutamic acid in which the by-products are of valuable character.

Steffen waste water, as is well known, is the residual solution which remains after the precipitation of sugar from beet molasses by lime according to the well known Steffen process. This waste water contains compounds of potassium, sodium and calcium, some sugar and other carbohydrates and nitrogenous substances including glutamic acid and varying percentages of potential glutamic acid in the form of the anhydride, pyrrolidone carboxylic acid. The latter must be converted into glutamic acid by acid or alkaline hydrolysis at some point during the processing of such waste water in order to obtain a full recovery of glutamic acid. Several processes have already been developed for the recovery of glutamic acid from Steffen waste water, but they have left much to be desired in several respects, for example, the purity of the glutamic acid obtained and the usefulness of the by-products. The prior art processes also have been especially unsatisfactory for the economical treatment of waste water containing low percentages of glutamic acid. For example, none of the known processes has been found practical for the treatment of waste water containing less than 9% to 10% of glutamic acid upon the dry solids.

In accordance with the present invention, a process has been developed which will render it possible to treat Steffen waste water containing less than 8.5% of glutamic acid on the dry solids contained therein while producing a glutamic acid of high purity. Also in accordance with such process a large proportion, namely about 75%, of the alkali metal salts contained in the waste water may be recovered in the form of potassium and sodium sulphates of high purity containing 45% or more of $K_2O$, a product which is valuable as a fertilizer.

It has been discovered that certain Steffen waste waters possess an alkalinity in the form of soluble lime and potassium and sodium hydroxides such that they possess a pH varying between 12.7 and 13, and that the pyrrolidone carboxylic acid contained in such waste water will hydrolyse substantially completely when treated for a sufficient period of time at a proper temperature without the addition of alkaline material or acids. This not only effects a saving upon materials used but also avoids introduction of foreign materials which must later be removed or which lessen the value of the products produced. The resultant hydrolysed product is then carbonated to remove lime until it assumes a pH of about 12, and the carbonated product is partially concentrated by evaporation of water in a multiple effect evaporator to 20% to 40% dry substance. At this point sulfuric acid is added to reduce the pH of the partially concentrated material to about 3 to 3.2 and the salts which crystallize upon such acidification are separated. The remaining liquor is then subjected to further evaporation for the removal of water, after a treatment with activated carbon to remove colloidal substances if this is found desirable. The second evaporation causes further crystallization of salts and such evaporation is continued until a point where, after removal of the crystallized salts, the liquor contains 65% to 75% dry substance. The temperature of the liquor at the end of the evaporation should be maintained between 60° C. and 75° C., preferably around 65° C. After separation of the crystallized salts the liquor is diluted with water to 60% to 70% dry substance and is allowed to cool whereby glutamic acid of 92% to 98% purity crystallizes out.

By avoiding the addition of sodium hydroxide or other alkaline materials to Steffen waste water to effect hydrolysis, it is possible to avoid contamination of the salts crystallized out so that a product is obtained in which the potassium content is about 45% calculated as $K_2O$ and provides a valuable fertilizer material. The acidification of the Steffen waste water takes place when such waste water is only partially concentrated whereby it has been found that the production of humic substances is substantially avoided. Also by acidifying the partially concentrated waste water it is possible to cause crystallization of a substantial quantity of potassium and sodium salt at a point in the process where they cannot disturb the evaporation of the liquor.

The following example, in which the individual steps are designated by number, will further illustrate the practice of this invention.

1. *Hydrolysis*

Steffen waste water produced in the Rocky Mountain region which has a natural alkalinity in the form of calcium, potassium and sodium hydroxide sufficient to give such waste water a pH of 12.7 to 13.0 at 25° C., is taken directly as it is discharged from the desugarizing process at a temperature of 85° C. to 90° C. and introduced into suitably insulated storage containers to maintain the waste water near to the temperature of discharge at least for a period of 24 to 48 hours, whereby substantially complete hydrolysis of the pyrrolidone carboxylic acid is achieved. Equally good results are obtained if the temperature is allowed to fall gradually as by natural radiation to about 57° C. The average results for 80 days in a pilot plant show an initial temperature of 83° C. in the storage containers, a final temperature at the end of 48 hours of 57° C. and a percentage of hydrolysis of 97.5%. The glutamic acid content of such Steffen waste water was between 6% and 8.5% on the dry solids contained therein.

2. *Carbonation*

The hydrolysed liquor is taken without intentional cooling and subjected to carbonation by passing $CO_2$ therethrough until a pH of about 12 is reached. The calcium, which is originally present in the waste in a quantity of approximately 8% on dry substance calculated as CaO, is precipitated as $CaCO_3$ and such precipitate is removed by filtration. The resulting carbonated waste contains about 2.0% to 2.5% of dry substance.

3. *Partial concentration*

The carbonated waste is then placed in a multiple effect evaporator in which the temperature in the first stage is maintained between 115° C. and 120° C. and the temperature in the last stage is maintained between 65° C. and 80° C. The partial concentration is carried up to about 45% Brix which is equivalent to 40% dry substance, and a specific gravity of 1.20. The preferable range of partial concentration is between 20% and 40% dry substance, corresponding to a specific gravity range of about 1.10 to 1.20.

4. *Acidification*

The partially concentrated waste is acidified with sulfuric acid in sufficient quantity to bring the pH down to between 3.0 and 3.2. This requires approximately 22% to 25% $H_2SO_4$ on the dry substance. In pilot plant operation undiluted 66° Bé. sulfuric acid was used without causing charring or the formation of humic substances. For full scale operation, where large volumes are handled it is advisable to dilute the sulphuric acid with an equal quantity of water to prevent possible overheating which might cause charring and the formation of humic substances.

In Steffen waste water having a glutamic acid content not over 8.5% on the dry solids the preferable acidification is to a pH value of approximately 3.0 to 3.2 and this pH value is maintained throughout the remaining procedure for the recovery of glutamic acid. Further adjustment is seldom necessary.

In some instances where the Steffen waste water has a glutamic acid content higher than 8.5% on the solids it is advisable to continue the acidification to a pH of about 2.0 to 2.5 in order to minimize precipitation of glutamic acid in the later evaporation. In such instance it is necessary to raise the pH of the liquor again to about 3.4 to 3.2 before crystallization of the glutamic acid therefrom.

5. *Separation of crystallized salts*

Upon acidification of the partially concentrated liquor, potassium and sodium sulfates crystallize out and these are removed from the partially concentrated liquor by centrifuging, filtration or other suitable means. About 65% of the recoverable salts are removed from the liquor at this stage. They are valuable as a source of potash for fertilizer as the potassium content is 40% to 45% calculated as $K_2O$.

6. *Treatment with activated carbon*

After removal of the crystallized salts from the acidified partially concentrated liquor it is sometimes desirable to treat the liquor with activated carbon if the quantity of colloidal substances present is sufficient to interfere with the recovery of glutamic acid by flocculation and separation with the glutamic acid. The removal of the colloidal substances with activated carbon at this point in the process is especially effective because of the acid condition of the liquor. The amount of activated carbon required is dependent upon the severity of the conditions to be corrected.

7. *Second evaporation and removal of second crop of salts*

After removal of the salts and the carbon treatment the liquor contains about 30% to 40% dry substance and has a specific gravity of 1.18 to 1.20. This liquor is further evaporated in a salt pan evaporator to 67% to 70% dry substance as determined by refractometer. The specific gravity is between 1.32 and 1.35. The evaporation is conducted as rapidly as possible under reduced pressure so that the temperature of the boiling liquor is between 60° C. and 75° C., preferably between 65° C. and 70° C. The time and temperature for the evaporation are kept at a minimum to prevent loss of glutamic acid by reversion to pyrrolidone carboxylic acid but the temperature should not be below 60° C. to 65° C. to prevent crystallization of glutamic acid. During the evaporation a second crop of salts crystallize out which are of a composition similar to that of the first crop and these are separated by centrifuging or filtration. Care should be taken that the temperature of the liquor does not fall below 60° C. to 65° C. before the salts are removed to minimize loss of the glutamic acid.

The total amount of the salts removed in the two stages varies with the type of waste water processed. Pilot plant results show that the amount is 40% to 45% on the original solids and that approximately 75% of the total salts are removed.

8. *Crystallization of glutamic acid*

Immediately upon removal of the second crop of salt crystals the mother liquor is diluted to 63% to 65% refractometer dry substance (specific gravity of 1.25 to 1.30). The diluted liquor is then placed in crystallizing vessels equipped with cooling means and agitators. The time required for the crystallization is about 96 to 120 hours. The crystallized glutamic acid is separated and washed. The yield amounts to 60% to 65% of the total quantity present in Steffen waste water containing 6% to 8.5% glutamic acid on the solids. The purity of the glutamic acid obtained is 92% to 98%. If the acidification of the liquor after partial concentration had been to a pH value below 3.0 to 3.2 it is necessary that the pH value be adjusted to about 3.2 before crystallization of the glutamic acid.

9. Utilization of liquor remaining after separation of glutamic acid

The mother liquor remaining after the removal of glutamic acid contains betaine and other nitrogenous substances and may be further processed for their recovery. Preferably, however, it is neutralized with lime or other suitable alkali to a pH of about 6.0 to 7, whereby it is rendered suitable for use as stock feed. It contains nitrogen compounds equivalent to 30% to 35% protein and 10% to 15% carbohydrates on total solids.

I claim:

1. In a process for the recovery of glutamic acid from Steffen waste water, wherein Steffen waste water is maintained at elevated temperatures to hydrolyse pyrrolidone carboxylic acid therein and then is carbonated and filtered to remove calcium compounds, the steps which comprise concentrating the carbonated hydrolysed waste water until a partially concentrated liquid having a dry substance content of from 20% to 40% is obtained, acidifying the partially concentrated waste water to a pH of about 3.2, removing the solids that precipitate, and further concentrating the acidified partially concentrated liquor until its dry substance content is about 67 to 70% to precipitate a further crop of solids and obtain a liquor containing the recoverable glutamic acid with little contamination by humic substances.

2. In a process for the recovery of glutamic acid from Steffen waste water, wherein Steffen waste water is maintained at elevated temperatures to hydrolyse pyrrolidone carboxylic acid therein and then is carbonated and filtered to remove calcium compounds, the steps which comprise concentrating the carbonated hydrolysed waste water until a partially concentrated liquid having a dry substance content of from 20% to 40% is obtained, acidifying the partially concentrated waste water to a pH of about 3.2 with sulfuric acid, removing the solids that precipitate, and further concentrating the acidified partially concentrated liquor until its dry substance content is about 67 to 70% to precipitate a further crop of precipitate solids and obtain a liquor containing the recoverable glutamic acid with little contamination by humic substances.

3. In a process for the recovery of glutamic acid from Steffen waste water, the steps which comprise subjecting raw Steffen waste water at a pH of about 12.7 to 13 to temperatures between 90° and about 57° C. for a period of at least 24 hours sufficient to hydrolyse substantially completely the pyrrolidone carboxylic acid contained therein, carbonating the resulting hydrolysed liquor, removing the resulting precipitate, concentrating the resulting liquor to a dry substance content of about 20% to 40% to produce a partially concentrated liquor, acidifying the partially concentrated liquor to a pH value of about 3.2, removing salts that precipitate, and further to evaporating the acidified partially concentrated liquor until its dry substance content is about 67 to 70% to precipitate a further crop of salts and obtain a liquor containing the recoverable glutamic acid with little contamination by humic substances.

4. In a process for the recovery of glutamic acid from Steffen waste water, the steps which comprise subjecting raw Steffen waste water at a pH of about 12.7 to 13 to temperatures between 90° and about 57° C. for a period of at least 24 hours sufficient to hydrolyse substantially completely the pyrrolidone carboxylic acid contained therein, carbonating the resulting hydrolysed liquor, removing the resulting precipitate, concentrating the resulting liquor to a dry substance content of about 20% to 40% to produce a partially concentrated liquor, acidifying the partially concentrated liquor to a pH value of about 3.2, removing salts that precipitate, and further evaporating the acidified partially concentrated liquor at between 60° and 75° C. until its dry substance content is about 67% to 70% to precipitate a further crop of salts and obtain a liquor containing the recoverable glutamic acid with little contamination by humic substances.

5. In a process for the recovery of glutamic acid from Steffen waste water having inherently a pH value of about 12.7 to 13 and a glutamic acid content up to 8.5% on the dry solids contained therein, the steps which comprise taking such Steffen waste water directly as it is produced, maintaining it without any substantial reagent addition at temperatures between 90° and 57° for a period of at least 24 hours sufficient to hydrolyse substantially completely the pyrrolidone carboxylic acid contained therein, carbonating the resulting liquor until its pH is about 12, removing the resulting precipitate, concentrating the carbonated liquor to a dry substance content of about 20% to 40% to produce a partially concentrated liquor, acidifying the partially concentrated liquor with sulfuric acid to a pH value of between about 3.0 and 3.2, separating the resulting precipitate, and further concentrating the acidified partially concentrated liquor until its dry substance content is about 67 to 70% to precipitate a further crop of solids and obtain a liquor containing the recoverable glutamic acid with little contamination by humic substances.

ARTHUR N. BENNETT.

REFERENCES CITED

The following references are of record in the file of this patent:

UNITED STATES PATENTS

| Number | Name | Date |
| --- | --- | --- |
| 1,940,428 | Masuda | Dec. 19, 1933 |
| 1,947,563 | Masuda et al. | Feb. 20, 1934 |
| 1,973,574 | Marshall | Sept. 11, 1934 |
| 2,373,342 | Royal | Apr. 10, 1945 |

Certificate of Correction

Patent No. 2,535,117                                                                    December 26, 1950

ARTHUR N. BENNETT

It is hereby certified that error appears in the printed specification of the above numbered patent requiring correction as follows:

Column 4, line 13, for "3.4" read *3.0*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*